US009563768B2

(12) United States Patent
Li et al.

(10) Patent No.: US 9,563,768 B2
(45) Date of Patent: Feb. 7, 2017

(54) METHODS AND APPARATUS TO MANAGE PASSWORD SECURITY

(71) Applicant: Intel Corporation, Santa Clara, CA (US)

(72) Inventors: Hong Li, Folsom, CA (US); Tobias M. Kohlenberg, Portland, OR (US); Lawrence Hurst, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/359,437

(22) PCT Filed: Nov. 25, 2013

(86) PCT No.: PCT/US2013/071610
§ 371 (c)(1),
(2) Date: May 20, 2014

(87) PCT Pub. No.: WO2015/076835
PCT Pub. Date: May 28, 2015

(65) Prior Publication Data
US 2015/0254452 A1 Sep. 10, 2015

(51) Int. Cl.
*G06F 21/46* (2013.01)
*G06F 21/45* (2013.01)
(Continued)

(52) U.S. Cl.
CPC ............. *G06F 21/46* (2013.01); *G06F 21/45* (2013.01); *G06F 21/554* (2013.01); *H04L 63/083* (2013.01); *H04L 67/10* (2013.01)

(58) Field of Classification Search
CPC ........ G06F 21/46; G06F 21/554; G06F 21/45; H04L 67/10; H04L 63/083
See application file for complete search history.

(56) References Cited

U.S. PATENT DOCUMENTS 6,145,086 A * 11/2000 Bellemore .............. G06F 21/46
380/1
2002/0166067 A1 * 11/2002 Pritchard .............. G06F 21/554
726/4

(Continued)

OTHER PUBLICATIONS

International Searching Authority, "International Search Report and Written Opinion," issued in connection with corresponding International Patent Application No. PCT/US2013/071610, mailed Aug. 26, 2014 (10 pages).

(Continued)

*Primary Examiner* — Dao Ho
*Assistant Examiner* — Cheng-Feng Huang
(74) *Attorney, Agent, or Firm* — Hanley, Flight & Zimmerman, LLC

(57) ABSTRACT

Methods, apparatus, systems and articles of manufacture are disclosed to manage password security. An example apparatus includes an alarm action engine to invoke a provisional transmission block in response to detecting entry of a candidate password, a password linkage monitor to retrieve a list of password hash values associated with previously used passwords, and to compare the list of password hash values to a hash of the candidate password, the alarm action engine to invoke a permanent block of the candidate password when a match condition occurs between the hash of the candidate password and a hash of one of the list of password hash values.

20 Claims, 7 Drawing Sheets

(51) Int. Cl.
*G06F 21/55* (2013.01)
*H04L 29/06* (2006.01)
*H04L 29/08* (2006.01)

(56) References Cited

U.S. PATENT DOCUMENTS

| | | | |
|---|---|---|---|
| 2003/0110401 A1* | 6/2003 | Aoshima | G06F 21/31 726/7 |
| 2007/0169178 A1* | 7/2007 | Keohane | H04L 63/0846 726/4 |
| 2007/0220270 A1 | 9/2007 | Murakami | |
| 2008/0046369 A1* | 2/2008 | Wood | G06F 21/31 705/50 |
| 2008/0104411 A1 | 5/2008 | Agrawal et al. | |
| 2009/0037984 A1 | 2/2009 | Andrasak et al. | |
| 2009/0150677 A1* | 6/2009 | Vedula | G06F 21/46 713/183 |
| 2010/0115201 A1* | 5/2010 | Hsu | G06F 12/1425 711/115 |
| 2010/0154039 A1 | 6/2010 | Carolan | |
| 2010/0253964 A1* | 10/2010 | Isshiki | G06F 3/1203 358/1.14 |
| 2012/0060007 A1* | 3/2012 | Baik | G06F 15/17325 711/163 |
| 2013/0263263 A1* | 10/2013 | Narkolayev | G06F 21/51 726/22 |
| 2014/0140508 A1* | 5/2014 | Kamath | H04L 9/0822 380/255 |
| 2014/0165166 A1* | 6/2014 | Kurkure | G06F 21/31 726/6 |

OTHER PUBLICATIONS wschools.com, "HTML Forms and Input," retrieved from <http://www.w3schools.com/>, 1999-2013 (3 pages).
Wikipedia, "Single Sign-on," retrieved from <http://www.en.wikipedia.org/wiki/Single_sign-on>, Aug. 15, 2013 (4 pages).
International Bureau, "International Preliminary Report on Patentability," issued in connection with International Patent Application No. PCT/US2013/071610, mailed Jun. 9, 2016 (7 pages).

* cited by examiner

| 302 SERVICE NAME | 304 CATEGORY | 306 DUPLICATE THRESHOLD | 308 ACTION |
|---|---|---|---|
| 310 → Picasa.com | Photography | 3 | Message |
| 312 → Kodak.com | Photography | 3 | Message |
| 314 → Shutterfly.com | Photography | 3 | Message |
| Yahoo.com | E-mail | 1 | Message |
| Gmail.com | E-mail | 1 | Message |
| Amazon.com | Shopping | 0 | Message + Block |
| Walmart.com | Shopping | 0 | Message + Block |
| Chase.com | Banking | 0 | Message + Block |
| Fidelity.com | Investing | 0 | Message + Block |
| Ameritrade.com | Investing | 0 | Message + Block |
| Facebook.com ** | Social | 8 | Message |
| Instagram.com | Social | 8 | Message |
| Pinterest.com | Social | 8 | Message |

FIG. 3

METHODS AND APPARATUS TO MANAGE PASSWORD SECURITY

FIELD OF THE DISCLOSURE

This disclosure relates generally to computing security, and, more particularly, to methods and apparatus to manage password security.

BACKGROUND

In recent years, security issues associated with users of computing devices has grown. Computing devices typically allow the users to participate in electronic mail (e-mail) activity, electronic banking, on-line investments and/or any other service that requires security credentials, such as a username and a corresponding password. Access to such services may occur at any location in which the computing device has access to one or more data networks, such as the Internet. Typically, the security credentials are maintained in secret by the user so that unauthorized access is prevented.

BRIEF DESCRIPTION OF THE DRAWINGS

FIG. 3 is an example category count table generated by the example client password manager of FIGS. 1 and 2A to manage password security.

DETAILED DESCRIPTION

Figure 1:
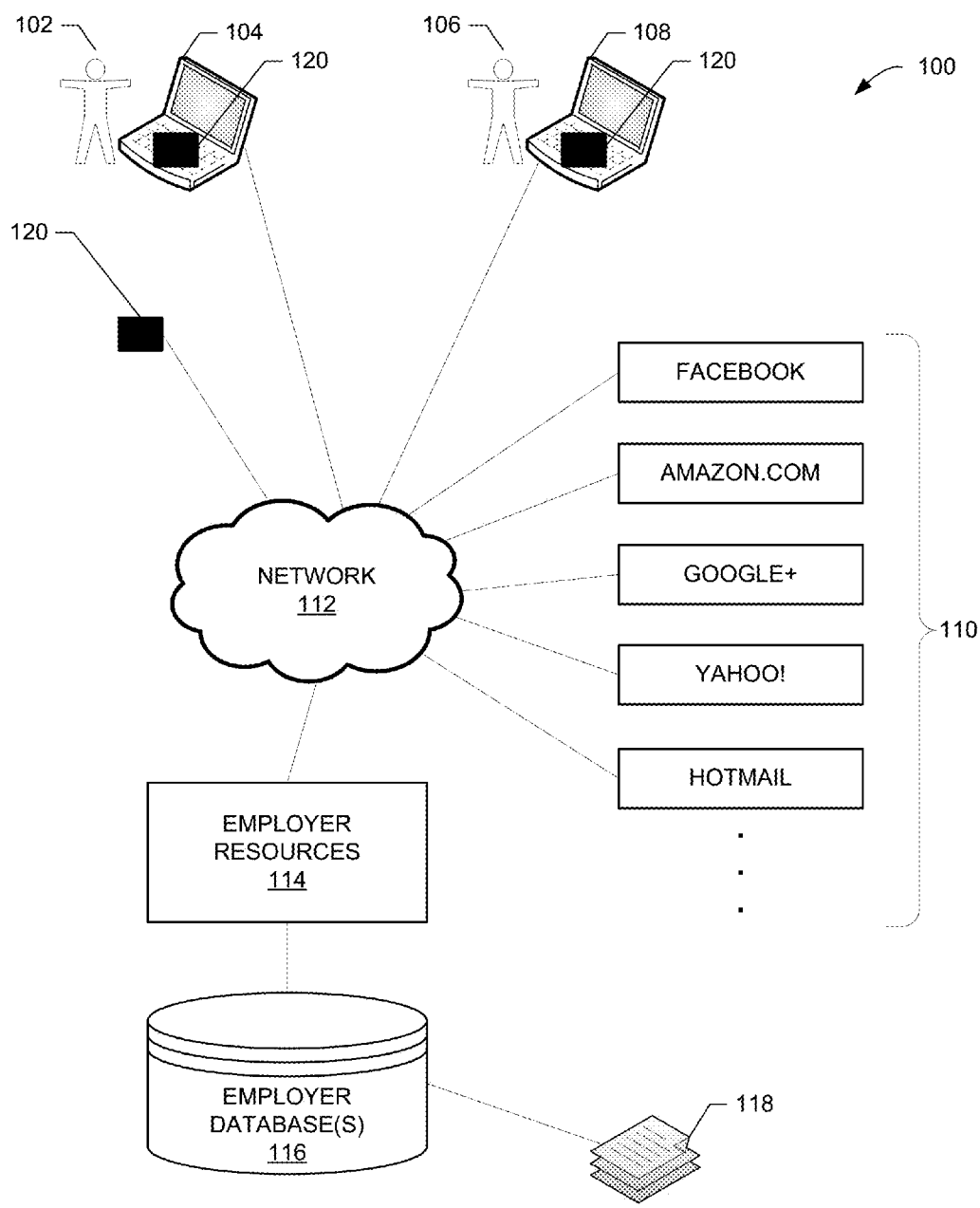
FIG. 1 is a schematic illustration of an example networked environment constructed in accordance with the teachings of this disclosure to manage password security.

On-line services have become a ubiquitous aspect of computing resources that allow users a convenient manner of managing their personal and/or professional lives. For example, on-line banking services allow users to initiate account deposits, account withdrawals, account transfers and/or bill payment services without a need to travel to a physical banking establishment. In other examples, users of on-line services may conduct investment transactions, send/receive e-mail messages and/or participate in social networking activities from the convenience of their respective homes, offices and/or mobile devices. Prior to accessing such services, each user typically provides unique credentials that, once authenticated, permit one or more transactions to occur.

Unique credentials may be provided by the user via an authorization prompt, such as web-based authorization screen that is rendered on a browser of the computing device (e.g., a computer, a laptop, a tablet (e.g., an Apple® iPad®), a wireless telephone, etc.). In some examples, the unique credentials include a username and a corresponding password. When a unique combination of such credentials are entered and transmitted from the user computing device to the service of interest (e.g., a bank website, a social media website, an e-mail website, etc.), the user is granted access to the content(s) associated with that service of interest (e.g., access to banking information, access to social media activity, access to e-mail messages, etc.).

However, while entry of the unique credentials may grant the user access to the service of interest, entry of the same unique credentials by anyone else will similarly grant that person access to the service of interest. Additionally, because some users will employ the same password with two or more services, a hacker may simply change the username in a manner that may conform with any other service while applying the same password. For example, if a legitimate user (i.e., a user that is a true creator and/or owner of information for a particular service) creates a username in a consistently similar format (e.g., first initial followed by last name, first_name.last_name@email.com, etc.) for both a first service (e.g., Facebook®) and a second service (e.g., LinkedIn®), then the hacker does not need to apply many changes if the same password is used between the first service and the second service. As such, in the event the hacker learns of the password for the first service, then the security associated with the second service is at risk of breach. In other words, when a user employs the same password for two or more services, a single privacy breach that reveals that password creates multiple potential instances of harm for that user.

Example methods, apparatus, systems and/or articles of manufacture disclosed herein minimize, reduce and/or otherwise eliminate multiple potential instances of security risk associated with user credential management. While users of computing devices may attempt to use the same passwords for two or more services based on a desire for simplicity and/or an ease of recall, example methods, apparatus, systems and/or articles of manufacture disclosed herein to manage password security identify instances of password creation that expose multiple points of failure and/or harm to the user in the event one password is discovered by a hacker.

FIG. 1 is a schematic illustration of a networked environment 100 in which passwords are used by one or more users to access network-based services. In the illustrated example of FIG. 1, the environment 100 includes a first employee 102 with a first computing device 104 and a second employee 106 with a second computing device 108. Each of the first employee 102 and the second employee 106 may access online services 110 via one or more network(s) 112 (e.g., the Internet), and may also use the first computing device 104 and the second computing device 108 to access employer resources 114. Assuming that the first employee 102 and the second employee 106 are employed by the employer that manages the employer resources 114, corresponding databases 116 and/or documents 118 therein may be accessible to the first employee 102 and the second employee 106 if authorized credentials are provided to one or more security protocols of the employer resources 114 (e.g., an authorized pair of username and password). The example environment 100 of FIG. 1 also includes a client password manager 120, which is described in further detail below to manage password security. The client password manager 120 may operate within each computing device of the example environment, such as within the example first computing device 104 and the example second computing device 108. In other examples, the example client password manager 120 may operate as an external service of one or more computing devices, such as a service connected via one or more networks (e.g., cloud-based access via the Internet).

In operation, the first employee 102 may access the employer resources 114 by entering a username formed by a standardized e-mail format having a first name and a last name separated by a period ("."). Additionally, one or more security systems associated with the employer resources 114 may be configured to associate the username with a unique password before allowing access to the employer resources 114 and/or databases 116 and documents 118 therein. A similar combination of the username and password may be established by the example employer resources 114 for the second employee 106 and/or any number of additional employees. While the first employee 102 and the second employee 106 may use their corresponding first computing device 104 and second computing device 108 to access the employer resources 114, such first computing device 104 and second computing device 108 may also be used to access the example online services 110.

The example online services 110 of FIG. 1 may include, but are not limited to e-mail accounts, social media accounts, personal financial accounts, investment accounts and/or online shopping accounts. Each of the example online services 110 may have a corresponding website and/or other portal (e.g., servers to accommodate wireless device application connection(s)) to facilitate access. Additionally, each of the example online services 110 may require a username and a password prior to gaining access and/or functionality. In the illustrated example of FIG. 1, assume that the first employee 102 uses a unique password for access to the employer resources 114 and all of the example online services 110. In other words, the first employee 102 exhibits prudent security behaviors by utilizing a different password for each and every online service. On the other hand, assume that the second employee 106 uses the same password for a Facebook® account, a Hotmail® account and the employer resources 114.

In the event a hacker compromises the Facebook® servers and/or otherwise acquires password information for Facebook® users (including the second employee 106), then that hacker now has half of the necessary credentials to break-in to the employer resources 114. Additionally, because the hacker may freely access the Facebook® account of the second employee 106, the hacker may utilize derivative information from the Facebook® account to learn other things about the second employee 106. For example, the second employee 106 may post information on the Facebook® account indicative of a place of employment and/or a recent promotion found on a merchant website (e.g., Amazon.com). Armed with information about the place of employment, the hacker may obtain the second half of necessary credentials and simply guess at a username format that is likely to result in access, such as a first name and last name separated by a period ("."). In short, because the second employee 106 exhibits relatively poor password management behaviors, one or more assets associated with the employer (i.e., employer resources 114, database(s) 116, document(s) 118) are at risk of misuse and/or retrieval by the hacker.

Figure 2A:
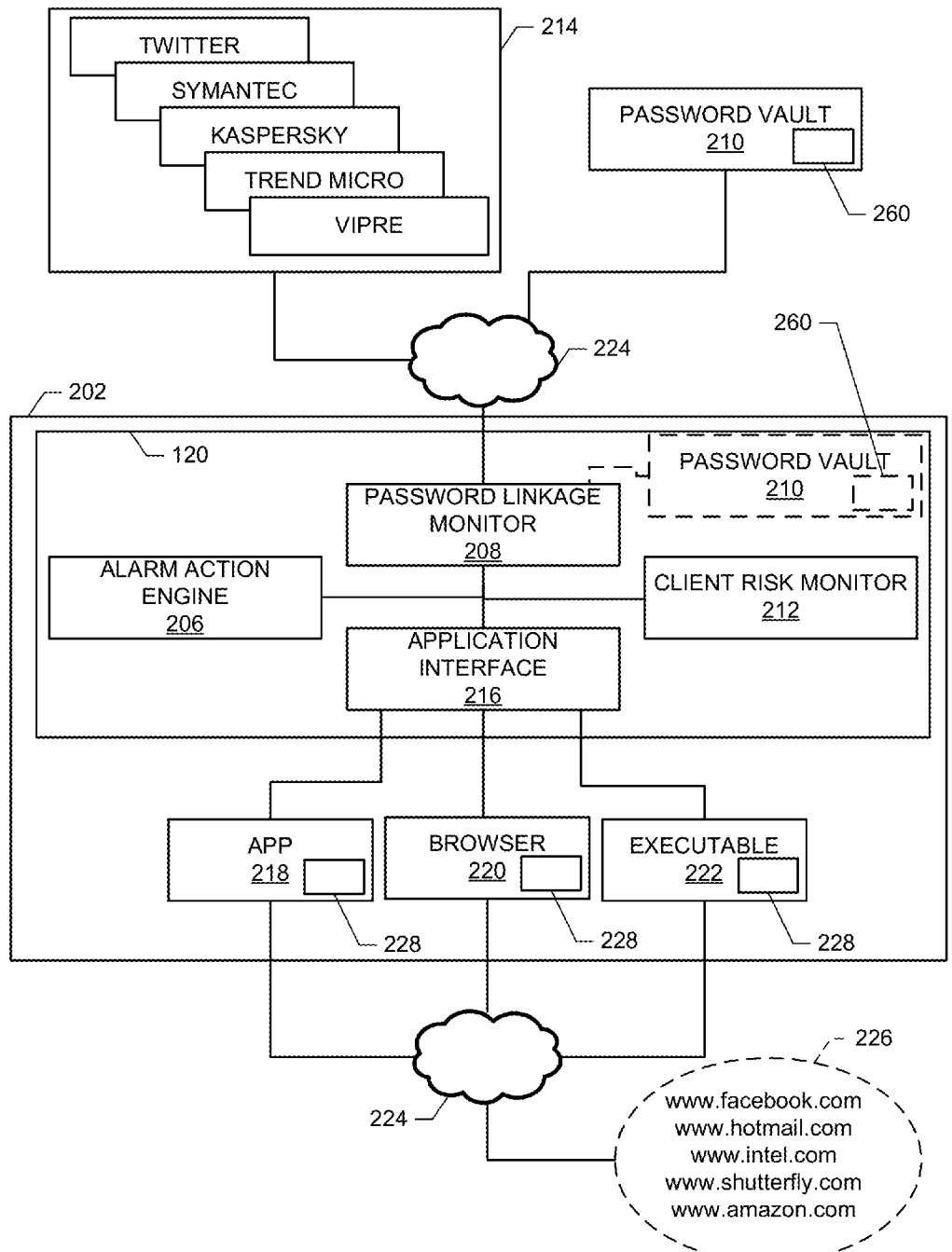
FIG. 2A is a schematic illustration of an example client password manager of FIG. 1 constructed in accordance with the teachings of this disclosure.

FIG. 2A is a schematic illustration of a computing environment 200 that includes an example computing device 202 and the example client password manager 120 to manage password security. In the illustrated example of FIG. 2A, the client password manager 120 includes an alarm action engine 206, a password linkage monitor 208 communicatively connected to a password vault 210, and a client risk monitor 212 communicatively connected to one or more security feeds 214. The example password vault 210 may reside within the example computing device 202 as a protected portion of memory and/or may be accessible via one or more networks (e.g., the Internet) as a cloud-based service. As described in further detail below, communication to and/or from the example password vault 210 may be hashed so that any intercepted information (e.g., passwords and/or usernames) are less likely to be identified. The example password vault 210 also includes an example vault query engine 260 to determine whether the value (e.g., one or more vault databases) includes any duplicates of a password of interest. In other examples, the example vault query engine 260 may operate within the client password manager 120 (outside of the password vault 210, existing or future) or the password change monitor 228, as described in further detail below.

The example security feeds 214 may include any number of informational sources related to security that reveal when a particular service has been compromised. Example security feeds 214 may include, but are not limited to news feeds, rich site summary (RSS) feeds, one or more websites, tweets from Twitter® feeds, e-mail updates and/or cyber security notifications from municipalities, local security applications (e.g., McAfee), social networks and/or government organizations (e.g., the United States Department of Homeland Security). Such feeds allow example methods, apparatus, systems and/or articles of manufacture disclosed herein to detect password hacking activity. The example client risk monitor 212 may also acquire, retrieve and/or otherwise obtain information related to security issues from security companies/company websites and/or online security threat report services, such as Symantec®, Kaspersky®, TrendMicro® and Vipre®.

The example client password manager 120 also includes an example application interface 216 that is communicatively connected to one or more applications of the example computing device 202. Applications may include, but are not limited to, mobile device applications 218 (e.g., applications ("apps") downloaded and/or otherwise installed on the computing device from an application repository (e.g., the Android® App Store, the Apple® iTunes App Store, etc.)). Applications may also include one or more browsers 220, such as the Firefox® browser by Mozilla®, the Chrome® browser by Google®, or the Safari® browser by Apple®. Without limitation, applications may also include executables 222 (e.g., programs) that execute on the example computing device 202 (e.g., accounting software, personal banking software, enterprise security management software, etc.). Each application includes an example password change monitor 228 to determine whether one or more password-related prompts are present within the application, as described in further detail below in connection with FIG. 2B. Each application (e.g., the example mobile device application 218, the example browser application 220, the example executables 222) may also be communicatively connected to a network 224 (e.g., the Internet) to facilitate communication to/from one or more services 226, such as example financial services, social networking services, on-line merchants, etc. Prior to the one or more services 226 providing and/or otherwise allowing access, an authorized username and password combination must be provided thereto.

Figure 2B:
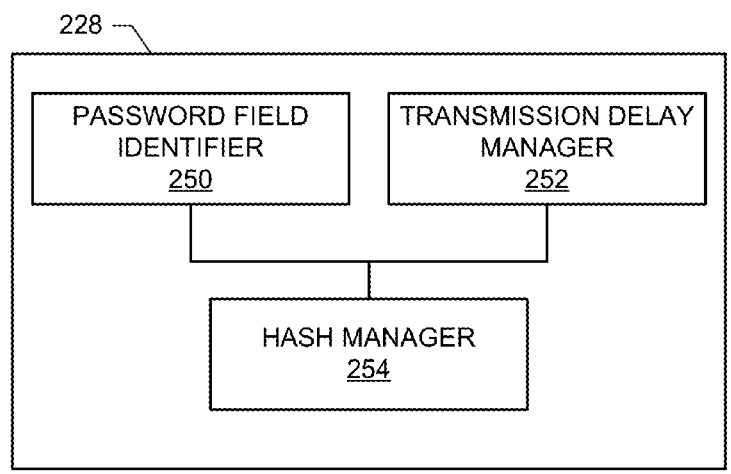
FIG. 2B is a schematic illustration of an example password change monitor of FIGS. 1 and 2A constructed in accordance with the teachings of this disclosure.

FIG. 2B includes additional detail associated with the example password change monitor 228 of FIG. 2A. While the illustrated example password change monitor 228 of FIG. 2B operates in a manner separate from the example client password manager 120, such examples are proffered for illustration and not limitation. In some examples, the password change monitor 228 is a part of the client password manager 120. In the illustrated example of FIG. 2B, the password change monitor 228 includes a password field identifier 250, a transmission delay manager 252 and a hash manager 254. In response to password activity, such as a password entry or a password change request prompt (e.g., a password field in a web page of the browser 220) detected by the example password field identifier 250, the example transmission delay manager 252 invokes a provisional delay and/or otherwise halts initial submission attempts of the password (a candidate password) further to one or more services 226. In other words, a provisional delay or block of the candidate password is invoked as a measure of safety to the user until the candidate password can be evaluated in view of one or more tests, such as a test to determine how many times the candidate password may have been previously used for one or more services. In some examples, detection of password activity causes the example password field identifier 250 to send a notification of password activity to the example client password manager 120. The example alarm action engine 206 of the example client password manager 120 may return, in response to the provisional delay notice, an instruction and/or authorization indicator to cause the example transmission delay manager 252 to permanently block and/or otherwise prohibit transmission of the entered password to the service of interest when the password is deemed dangerous and/or otherwise risky. On the other hand, the example client password manager 120 may return, in response to the provisional delay notice, an instruction and/or authorization indicator/code to cause the example transmission delay manager 252 to release the provisional block when the candidate password is determined to be unique or used less than a threshold number of times. The release may be invoked via one or more blocking release authorization code(s).

In some examples, the password field identifier 250 monitors HTML forms for one or more indications of data entry for a user of the computing device. If a web page, for example, includes form tags (e.g., "<form>"), then the example password field identifier 250 may parse and/or otherwise identify keywords associated with username and/or password entry options (e.g., first name, last name, user name, password, pwd, l_name, f_name, u_name, etc.). If the example password field identifier 250 detects an input type with the keyword "password," then the transmission delay manager captures entered password characters and transmits them to the example application interface 216 before allowing one or more submit operation(s) to advance and/or otherwise proceed. In other words, before an entered password is allowed to be sent to a service (e.g., Facebook®), example methods, apparatus, systems and/or articles of manufacture disclosed herein determine whether the password has been used for one or more alternate services (e.g., the same password used for both Facebook® and Amazon.com®).

The example password change monitor 228 sends entered password information to the example application interface 216 to determine whether the user has entered a password that is a duplicate of a password used at other services, as described in further detail below. In some examples, the example password change monitor 228 operates on the example computing device 202 and the example client password manager 120 is located remotely, such as a cloud-based service. In such circumstances, the example hash manager 254 calculates a hash of any password information (e.g., username and password combination, password, username, etc.) prior to sending the hashed information to the example application interface 216. In other examples, the application (e.g., the example app 218, the example browser 220, the example executable 222) operates within the example computing device 202, in which case the example hash manager 254 of the example password change monitor 228 is not needed and/or otherwise implemented.

As described above, the one or more services 226 may include, but are not limited to banking services, e-mail services, social networking services and/or online merchant services. In some examples, a first service may facilitate default authentication for other services, which may be referred to as single sign-on (SSO). SSO allows a user to log in with credentials (e.g., a username and password) at a first time with a first service (e.g., Facebook®), and the first service facilitates additional service access privileges without entering further credentials. For example, after the user logs in to Facebook®, the SSO services employed by Facebook® manage tasks associated with authentication for other services such as e-mail accounts, social media accounts, etc. While SSO services increase the ease of access for a user to remember a single password for different services (e.g., websites, social media services, etc.), and increase the speed at which the user may access other services by preventing a need to enter additional separate credentials, such SSO services also introduce a single point of risk that may affect multiple other services. In other words, in the event Facebook® user credentials are discovered by an attacker/hacker for a user that utilizes SSO services, that single breach may allow the attacker/hacker to access one or more alternate services of the user without a need for additional usernames and/or passwords.

In operation, the example client password manager 120 minimizes and/or eliminates attacker/hacker opportunities to gain access to two or more alternate services requested by a user in the event that a first service password is revealed and/or otherwise discovered by the attacker/hacker. In the event a user navigates to a service 226 and is presented with a request to enter a password, the example password field identifier 250 detects entry of password information. In response to detecting the entry of password information (candidate password), the example transmission delay manager 252 provisionally prevents the candidate password information from being transmitted to the service of interest 226. Instead, any indications of user submission attempts of the entered candidate password (e.g., a web page click of "log in," "sign in," "submit," etc.) are provisionally blocked for an amount of time or in response to a release indication from the example client password manager 120. In other words, the example transmission delay manager 252 provisionally prevents the candidate password from being used for authentication of the service of interest 226 until after that candidate password can be checked for usage with two or more other services. If the candidate password is ultimately deemed to be dangerous, risky and/or otherwise harmful to the security of the user, then the provisional block may be confirmed with a permanent block of the password.

Upon receipt of the candidate password by the example application interface 216, the candidate password is forwarded to the example password linkage monitor 208 to be hashed in the event it was not previously hashed by the example password change monitor 228. In some examples, the candidate password is not hashed by the example password change monitor 228 because the application (e.g., a wireless device app 218, a browser 220, an executable 222, etc.) is not external to the computing device 202, thereby less susceptible to interception. However, because the example password vault 210 of the illustrated example of FIG. 2A is located externally to the example computing device 202, the hash of the candidate password serves as a measure of safety. As described above, the example password vault 210 includes an example vault query engine 260 to determine whether the candidate password has been used before with one or more other services.

Figure 2C:
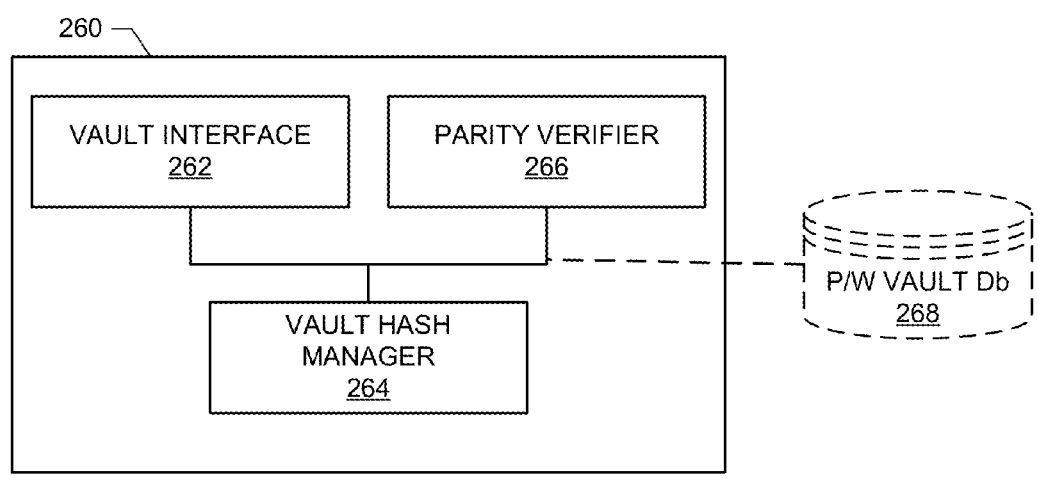
FIG. 2C is a schematic illustration of an example vault query engine of FIGS. 1 and 2A constructed in accordance with the teachings of this disclosure.

FIG. 2C includes additional detail of the example vault query engine 260. In the illustrated example of FIG. 2C, the vault query engine 260 includes a vault interface 262, a vault hash manager 264 and a parity verifier 266 communicatively connected to one or more password vault database(s) 268 managed by the password vault 210. In operation, the example vault interface 262 of the example vault query engine 260 receives and/or otherwise retrieves a hash (e.g., a string of characters resulting from a hash operation) of the candidate password from the example client password manager 120. The parity verifier 266 invokes the example vault hash manager 264 to calculate hash values for all of the passwords stored in the password vault 210, which may be stored in one or more password vault databases 268. The hash calculations performed by the example vault hash manager 264 employ the same hash formula that was used by the example password linkage monitor 208 or the example hash manager 254 so that hash operations on the same clear-text password result in the same hash value.

The example parity verifier 266 compares the received and/or otherwise retrieved hash value associated with the candidate password with all of the resulting hash values for passwords stored in the password vault 210. In other examples, the comparison between the candidate password hash value and a list of hash values associated with vault passwords may be performed by the example client password manager 120. For example, the example client password manager 120 may receive and/or otherwise retrieve a list of vault password hash values on a periodic, manual, scheduled and/or aperiodic basis so that the example password linkage monitor 208 can perform comparisons. In the event the example parity verifier 266 does not find a match between hash values, then the example vault interface 262 transmits to the example client password manager 120 an indication that the candidate password has not been re-used on a prior occasion. On the other hand, in the event the example parity verifier 266 identifies a match between the hash value associated with the candidate password and one or more hash values from the example password vault 210, then the example vault interface 262 transmits to the example client password manager 120 an indication that the candidate password has been used on at least one prior occasion. Additionally, the example parity verifier 266 counts a number of instances where the hash of the candidate password matches a hash from the example vault interface 262 and transmits that count value to the example client password manager 120. In some examples, the vault interface 262 transmits and/or otherwise makes available a service name that corresponds to one or more instances of a hash match. For example, if the hash associated with the candidate password (e.g., a candidate password for e-mail service from Yahoo!®) matches two password hash instances in the vault 210 (e.g., one for Gmail® and one for Hotmail®), then the vault query engine 260 determines and sends the associated service name(s) for each match to the example password linkage monitor 208. Multiple instances of a match between the hash of the candidate password and hash values from the example password vault 210 are indicative of a user that is re-using the same password for multiple services, thereby creating additional risk in the event that particular password is discovered by an attacker/hacker.

In response to retrieving and/or otherwise receiving an indication from the example vault query engine 260 of a hash match of the candidate password and/or a count of the number of times the candidate password has been used with other services, the example password linkage monitor 208 invokes the example alarm action engine 206 if the password has been used before. The example alarm action engine 206 identifies a service category type and/or an entity category type associated with the candidate password and determines whether a number of hash matches exceed a threshold value for the identified category type. For example, a first type of service (e.g., online photography collection) may pose a less significant risk in the event of a breach when compared to a second type of service (e.g., personal bank accounts). A first threshold value for a service category type associated with online photography may be set to an integer value greater than two ("2") to allow the same password to be used with multiple services of the same category. On the other hand, a second threshold value for a service category type associated with personal banking may be set to one ("1") to prohibit and/or otherwise warn against using the same password for multiple services of a category associated with finances.

FIG. 3 illustrates an example service category count table 300 having a service name column 302, a category column 304, a duplicate limit value column 306 and an action column 308. In operation, the example alarm action engine 206 retrieves and/or otherwise receives an indication from the example vault query engine 260 of duplicate candidate password usage, a count of how many times the candidate password has been used, and service names associated with corresponding duplicate candidate passwords. For example, the alarm action engine 206 receives an indication that the candidate password was used on three prior occasions and is associated with the service names "Picasa.com," 310 "Kodak.com," 312 and "Shutterfly.com" 314. The example alarm action engine 206 stores each service name in the example service category count table 300 and determines a corresponding category for each of the services. In the illustrated example of FIG. 3, the example alarm action engine 206 has identified the three services as having a category type "photography" and a corresponding duplicate limit value of three "3." While the illustrated example service category count table 300 includes a duplicate limit value of three, any other threshold value may be chosen. When the threshold value is exceeded by a number of instances in which the same password is used for a particular category type, the example action column 308 identifies a corresponding alarm action to be invoked and/or otherwise executed by the example alarm action engine 206.

In the illustrated example of FIG. 3, when a service of type "photography" exceeds a threshold count value of three, a warning message is invoked by the alarm action engine 206 to be displayed on the computing device 202. In other examples of the illustrated example of FIG. 3, when a service of type "banking" exceeds a threshold count value of zero, both a warning message and a transmission block command are invoked by the alarm action engine 206. For example, the alarm action engine 206 sends the warning message and the transmission block command via the application interface 216 to the transmission delay manager 252, which may invoke one or more form submission commands to prevent password information entered into one or more fields of a portal (e.g., a web page) from being transmitted to the service of interest. In some examples, form submission commands may be facilitated by Javascript®. In still other examples, blocking commands may be applied to service portals via browser interfaces and/or plug-ins, but any other type of control may be used. Warning messages generated and/or sent by the example alarm action engine 206 may recite, for example, "Your password to Hotmail.com is the same as the password for Gmail.com." Additional example warning messages include "Your Facebook links to other applications that require user sign on, please consider using different passwords."

The example service category count table 300 also includes an SSO indicator 320 to identify one or more services that may employ SSO services. Generally speaking, example methods, apparatus, systems and/or articles of manufacture disclosed herein apply to both SSO services and/or instances where linked passwords are used. Linked applications include, for example, circumstances where a vendor (e.g., Google™ G-Mail™) accepts login credentials from a user, and then automatically signs that user into other services related thereto (e.g., chat services, online storage services, etc.). While examples disclosed herein continue to refer to circumstances involving SSO, such examples are provided for example and not limitation. In the illustrated example of FIG. 3, the service category count table 300 includes the SSO indicator 320 next to the Facebook® service, thereby indicating that Facebook® facilitates access to one or more other services. As described in further detail below, the example alarm action engine 206 may generate warning messages tailored to instances when a single password breach may affect separate services.

Returning to the illustrated example of FIG. 2A, in the event that password entry activity is not detected by the password change monitor 228 (e.g., one or more password change monitors 228 executing on one or more applications invoked by a user), then the client risk monitor 212 invokes one or more queries to security feeds 214. As described above, the example security feeds 214 may include information published and/or obtained via paid subscription for security related news and/or event updates. Example security feeds 214 may include information from security companies that monitor one or more networks for suspicious activity and generate notification information in response to detected and/or suspicious network behavior indicative of security breaches. Security feeds may include, but are not limited to report information from Symantec®, Kaspersky®, TrendMicro® and/or Vipre®. The example client risk monitor 212 may invoke the queries on a periodic, manual, scheduled and/or aperiodic basis to determine whether current events suggest a heightened security strategy.

For example, if a security feed publishes a report that Facebook® was successfully attacked and a hacker gained access to user passwords, then the example client risk monitor 212 may invoke the example alarm action engine 206 to prompt one or more users to take prudent action(s). In some examples, the client risk monitor 212 may invoke a warning message prompt that recites, "Our security reports indicate that Facebook has been hacked, and there is a possibility that your sign-on information has been compromised. Please proceed to change your password." As described above, in the event the query of security reports reveals hacker activity with Facebook®, and that Facebook® provides SSO services for the user, then the example alarm action engine 206 may further tailor a warning message to reference the one or more other services that may be affected by the security breach. For example, the alarm action engine 206 may generate a warning message that recites, "Our security reports indicate that Facebook has been hacked, and there is a possibility that your sign-on information has been compromised. We also notice that you use Facebook logon credentials to access Instagram and Yahoo e-mail accounts. We recommend that you immediately change passwords associated with these services."

While an example manner of implementing the client password manager 120 of FIG. 1 is illustrated in FIGS. 2A, 2B, 2C and 3, one or more of the elements, processes and/or devices illustrated in FIGS. 1, 2A, 2B, 2C and 3 may be combined, divided, re-arranged, omitted, eliminated and/or implemented in any other way. Further, the example alarm action engine 206, the example password linkage monitor 208, the example password vault 210, the example client risk monitor 212, the example application interface 216, the example password change monitor 228, the example password field identifier 250, the example transmission delay manager 252, the example hash manager 254, the example vault query engine 260, the example vault interface 262, the example vault hash manager 264, the example parity verifier 266 and/or, more generally, the example client password manager 120 of FIGS. 1 and 2A may be implemented by hardware, software, firmware and/or any combination of hardware, software and/or firmware. Thus, for example, any of the example alarm action engine 206, the example password linkage monitor 208, the example password vault 210, the example client risk monitor 212, the example application interface 216, the example password change monitor 228, the example password field identifier 250, the example transmission delay manager 252, the example hash manager 254, the example vault query engine 260, the example vault interface 262, the example vault hash manager 264, the example parity verifier 266 and/or, more generally, the example client password manager 120 of FIGS. 1 and 2A could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example alarm action engine 206, the example password linkage monitor 208, the example password vault 210, the example client risk monitor 212, the example application interface 216, the example password change monitor 228, the example password field identifier 250, the example transmission delay manager 252, the example hash manager 254, the example vault query engine 260, the example vault interface 262, the example vault hash manager 264, the example parity verifier 266 and/or, more generally, the example client password manager 120 of FIGS. 1 and 2A is/are hereby expressly defined to include a tangible computer readable storage device or storage disk such as a memory, a digital versatile disk (DVD), a compact disk (CD), a Blu-ray disk, etc. storing the software and/or firmware. Further still, the example client password manager 120 of FIGS. 1 and 2A may include one or more elements, processes and/or devices in addition to, or instead of, those illustrated in FIGS. 1, 2A, 2B, 2C, and 3-5, and/or may include more than one of any or all of the illustrated elements, processes and devices.

Figure 4:
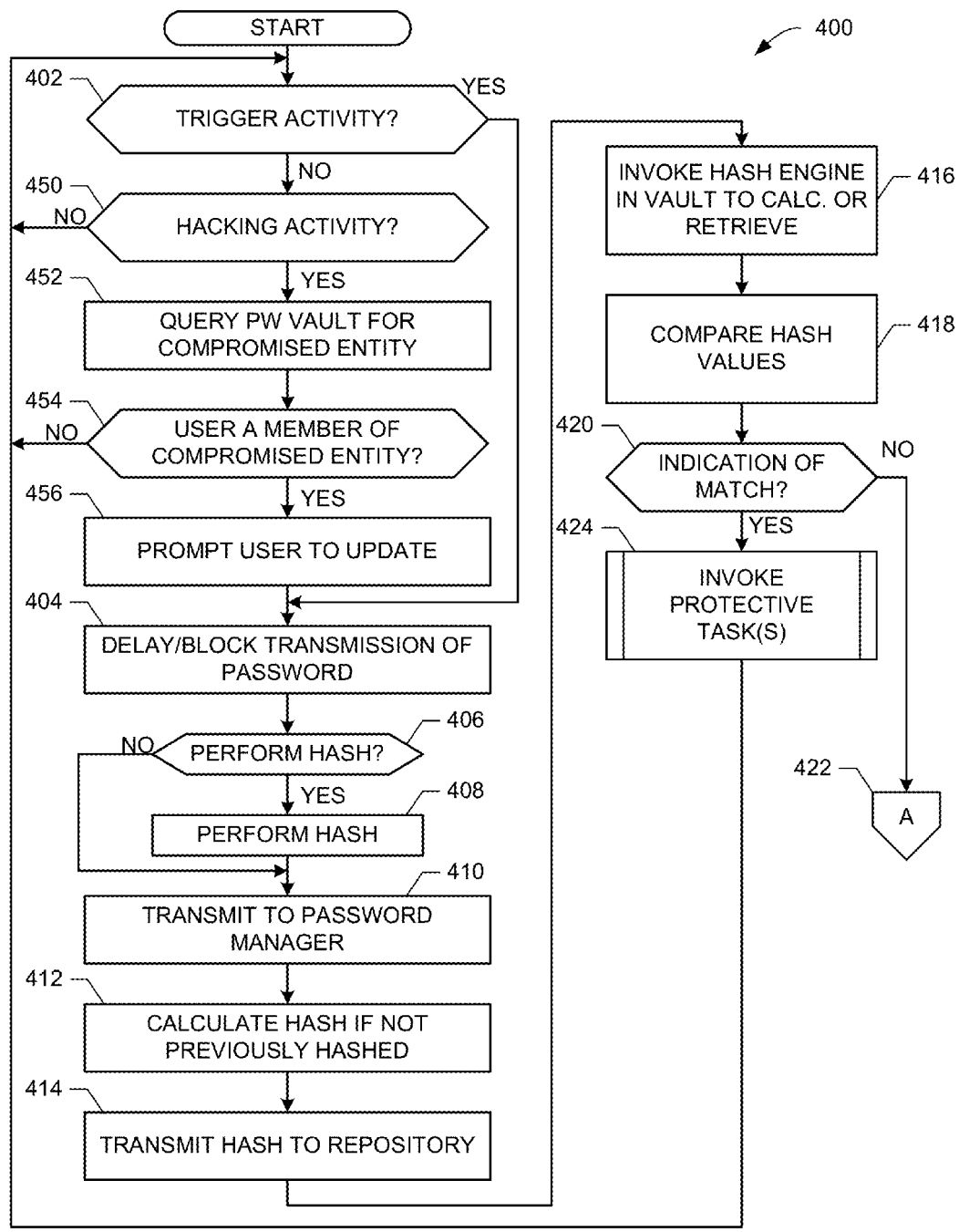
FIGS. 4 and 5 are flowcharts representative of example machine readable instructions that may be executed to manage password security.
Figure 5:
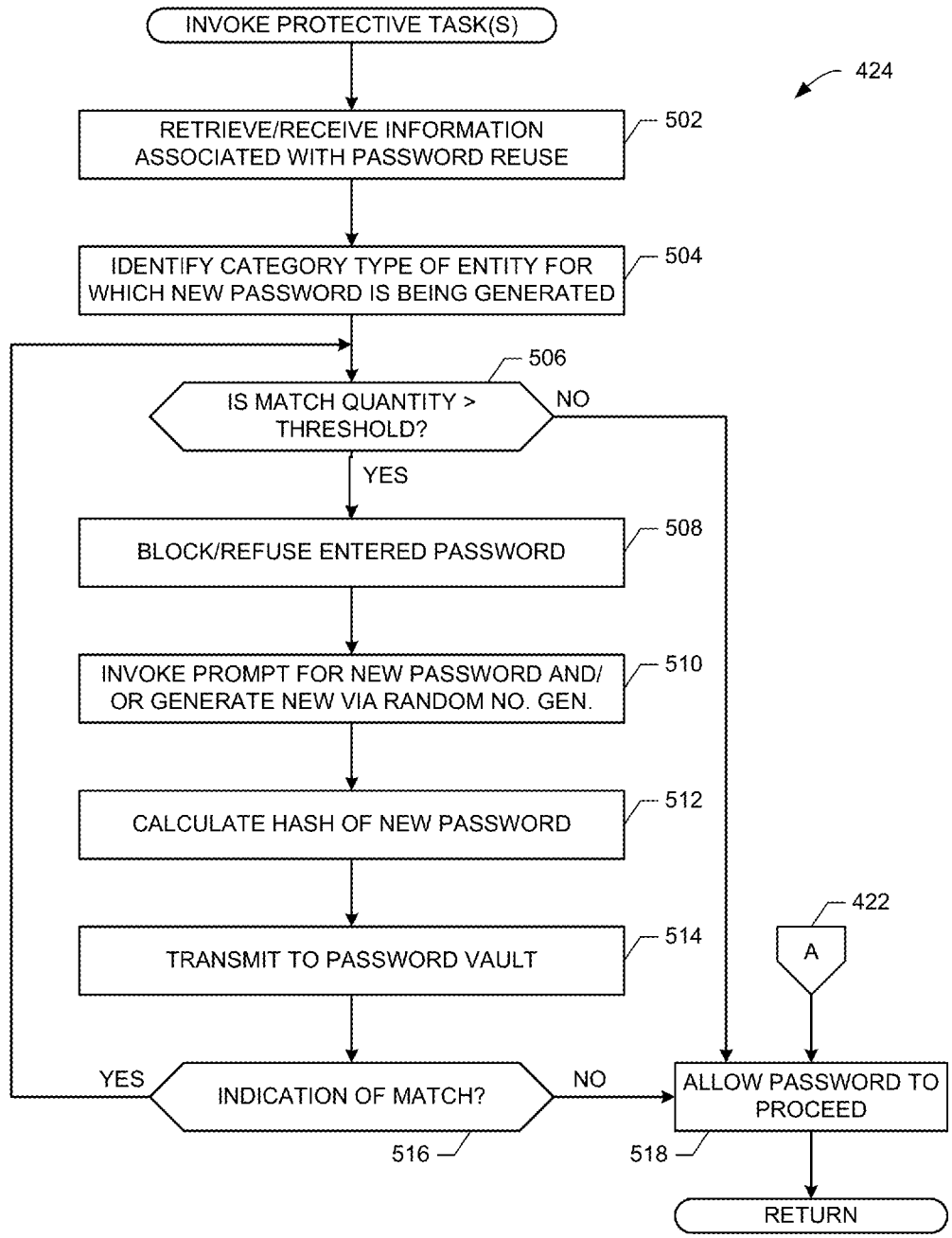

Flowcharts representative of example machine readable instructions for implementing the client password manager 120 of FIGS. 1 and 2A are shown in FIGS. 4 and 5. In these examples, the machine readable instructions comprise program(s) for execution by a processor such as the processor 612 shown in the example processor platform 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program(s) and/or parts thereof could alternatively be executed by a device other than the processor 612 and/or embodied in firmware or dedicated hardware. Further, although the example program(s) are described with reference to the flowcharts illustrated in FIGS. 4 and 5, many other methods of implementing the example client password manager 120 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 400 of FIG. 4 begins at block 402 where the example password change monitor 228 invokes the example password field identifier 250 to detect portal trigger activity. As described above, the example computing device 202 may include any number and type of portals to services, such as by way of mobile device applications 218, browsers 220 and/or executables 222. In the event the example password field identifier 250 detects (block 402) password entry and/or an attempt to submit a password to a service of interest (e.g., clicking on a web page "submit" icon), then the example transmission delay manager 252 prevents and/or otherwise blocks transmission of the entered password information (candidate password) to the service of interest (e.g., a candidate password entered and to be sent to Facebook®) (block 404). Rather than allow potentially duplicative password information to be used with, other otherwise generated for, the service of interest, example methods, apparatus, systems and/or articles of manufacture disclosed herein verify whether such password information is duplicative and/or in need of modification before being sent to the service of interest.

If the example client password manager 120 operates remotely to the example computing device 202, such as a cloud-based service, then the example password change monitor 228 is invoked (block 406) and a hash of the candidate password is calculated by the example hash manager 254 (block 408). Generally speaking, entry of the candidate password is typically performed by a user as clear-text, which is susceptible of simple identification by unauthorized persons (e.g., hackers, attackers) if intercepted. To minimize and/or eliminate the possibility of one or more harmful effects in the event the candidate password is intercepted, the example hash manager 254 calculates a hash of the candidate password to yield a one-way result (e.g., a string of characters dissimilar from the candidate password). On the other hand, in the event the client password manager 120 operates within the example computing device 202, then the transmission or transfer of a clear-text candidate password from the portal (e.g., a web page within a browser 220 of the computing device 202) may not need to be hashed (block 406). In either case, a hash of the candidate password or the candidate password itself is transferred to the example client password manager 120 (block 410).

The example application interface 216 receives and/or otherwise retrieves the candidate password or hash value of the candidate password from the portal (e.g., the mobile app 218, the browser 220, the executable 222) interacting with the service of interest, and forwards it to the example password linkage monitor 208 (block 412). In the event the candidate password is still in a clear-text format, then the example password linkage monitor 208 performs a hash of the candidate password (block 412) before sending the calculated hash value to a password repository (block 414). As described above, the password repository may be a password vault, such as the example password vault 210 of FIG. 2A. In some examples, the password vault 210 is located in the computing device 202 as a protected memory device, while in other examples the password vault 210 is located as a cloud-based service that is accessed via one or more networks (e.g., the Internet). In either case, the example password vault 210 includes the example vault query engine 260 to interact with the example password linkage monitor 208 so that one or more queries of current passwords stored in the vault 210 may be performed.

The example vault hash manager 264 performs a hash of all passwords stored in the vault (block 416), such as passwords stored in the example password vault database(s) 268. In some examples, the vault hash manager 264 performs hash calculations of stored passwords ahead of time, such as on a periodic, scheduled, manual or aperiodic basis. Such pre-hashed values may be stored in a memory accessible by the example vault hash manager 264 for later recall, as needed. The example parity verifier 266 compares the received/retrieved hash of the candidate password with the list of password hash values generated by the example vault hash manager 264 to determine whether one or more matches occurs (block 418). If no match is identified (block 420), control advances to block 422 to allow the candidate password to be utilized with the service of interest, as described in further detail below. On the other hand, in the event the example parity verifier 266 identifies one or more hash value matches (block 420), then control advances to block 424 to invoke one or more protective tasks.

FIG. 5 includes additional detail in connection with block 424 described above. In the illustrated example of FIG. 5, the example password linkage monitor 208 receives and/or otherwise retrieves information associated with password reuse from the example vault query engine 260 (block 502). The information associated with password reuse may include, but is not limited to, service names associated with matching hash values (e.g., Facebook®, Gmail®, Amazon.com®, etc.), a count value of the number of matching hash values, and/or whether any of the services having a match also employ SSO services. The example alarm action engine 206 identifies a category type associated with each service that was identified as having a password matching the candidate password (block 504). In some examples, the alarm action engine 206 generates and/or populates a service category count table to aid in determining corresponding corrective actions that may be taken in the event of password re-use, as described above in connection with the service category count table 300 of FIG. 3. The example alarm action engine 206 compares the number of detected hash matches with the example duplicate limit values associated with each corresponding category to determine whether a threshold value of matches has occurred (block 506).

In the event a threshold number of matches has been exceeded (block 506), the example transmission delay manager 252 is invoked by the example alarm action engine 206 via the application interface 216 to implement the corrective action. As described above in connection with FIG. 3, the action column 308 identifies a type of action to invoke (corrective action) in the event a corresponding threshold is exceeded. Assuming, in this example, that the corrective action requires a warning message and a candidate password block, the example transmission delay manager 252 prevents the candidate password from being transmitted (e.g., via the example network 224) to the service of interest 226 (block 508). In some examples, the transmission delay manager 252 removes any previously entered clear-text from a password field and/or invokes a prompt on the computing device indicative of a request/demand to utilize an alternate password for the service of interest (block 510). Additionally, the example application interface 216 or the example password change monitor 228 may include a random number generator to generate one or more candidate alternate passwords to be presented to the user for consideration.

If one of the candidate alternate passwords is selected and/or otherwise accepted by the user, or if the user generates a candidate alternate password, the example hash manager 254 calculates a hash of the new candidate alternate password (block 512). The hash value of the new candidate alternate password is transmitted to the example password vault 210 in a manner consistent with the program 400 of FIG. 4 (block 514), and if another indication of a match is detected (block 516), then control returns to block 506 to determine if the match exceeds a threshold count value associated with a category type related to the service of interest. On the other hand, if another indication of a match is not detected (block 516), then the example transmission delay manager 252 allows the password information to be transmitted to the service of interest (block 518). In some examples, the new password information is updated in the example password vault 210.

Returning to block 506, if the number of hash matching instances is not greater than a threshold value associated with a particular category, then the example transmission delay manager 252 is instructed to allow the candidate password to be used with the service of interest (block 518). In other words, the initially entered password has been determined to be either unique or it has not been used with more than a threshold number of separate services.

In addition to monitoring the example computing device 202 for instances when a duplicate password is attempted to be used with a service, example methods, apparatus, systems and/or articles of manufacture disclosed herein monitor one or more security feeds 214 in an effort to allow users to take preventative action before suffering the effects of password theft. Returning to FIG. 4, if the example password change monitor 228 does not receive and/or otherwise retrieve an indication of candidate password use (block 402), then the example client risk monitor 212 queries one or more security feeds 214 for an indication of hacking activity (block 450). If no indications of hacking activity are received and/or otherwise retrieved (block 450), then control returns to block 402 to continue to monitor for instances where a password is entered on the example computing device 202.

In the event the example client risk monitor 212 detects and/or otherwise receives an indication of hacking activity (e.g., a tweet from Twitter®, an RSS feed, a text message, etc.), which contains information related to the one or more services affected by the hacking activity (block 450), then the example password linkage monitor 208 queries the example password vault 210 to determine if the user of the example computing device 202 has any stored passwords associated by the affected service (block 452). For example, information related to hacking activity may include a report that Facebook® servers were hacked overnight and several thousand e-mail addresses and passwords were stolen. If the example password linkage monitor 208 does not identify that the user of the computing device 202 is a member of the affected group (block 454), then control returns to block 402 to continue monitoring for an instance of password use/entry on the example computing device 202. On the other hand, if the example password linkage monitor 208 identifies that the user of the computing device 202 is a member of the affected group (block 454), then the alarm action engine 206 is invoked to prompt a warning message on the example computing device (block 456). In some examples, the example password change monitor 228 is invoked by the alarm action engine 206 to cause navigation to the service that has been hacked, and prompt the user to immediately change their password (block 456). Control then advances to block 404 to invoke the example transmission delay manager 252 to ensure that any new candidate password entered by the user is either unique or used less than a threshold number of times with other services.

Figure 6:
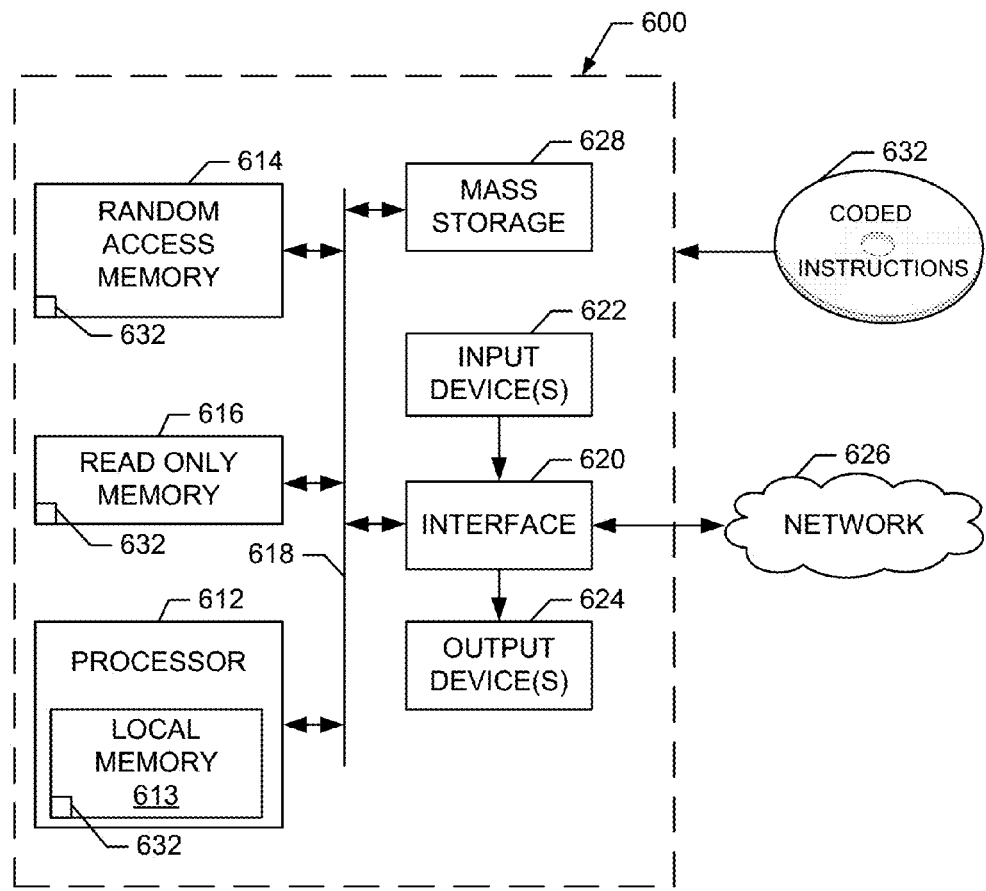
FIG. 6 is a schematic illustration of an example processor platform that may execute the instructions of FIGS. 4 and/or 5 to implement the example client password manager, the example password change monitor and/or the example vault query engine of FIGS. 1, 2A, 2B and/or 2C.

FIG. 6 is a block diagram of an example processor platform 600 capable of executing the instructions of FIGS. 4 and 5 to implement the client password manager 120, the password change monitor 228 and the vault query engine 260 of FIGS. 1, 2A, 2B and 2C. The processor platform 600 can be, for example, a server, a personal computer, a mobile device (e.g., a cell phone, a smart phone, a tablet such as an iPad™), an Internet appliance, a gaming console, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 4 and 5 may be stored in the mass storage device 628, in the volatile memory 614, in the non-volatile memory 616, and/or on a removable tangible computer readable storage medium such as a CD or DVD.

The following examples pertain to further embodiments. An example disclosed apparatus includes an alarm action engine to invoke a provisional transmission block in response to detecting entry of a candidate password, a password linkage monitor to retrieve a list of password hash values associated with previously used passwords, and to compare the list of password hash values to a hash of the candidate password, the alarm action engine to invoke a permanent block of the candidate password when a match condition occurs between the hash of the candidate password and a hash of one of the list of password hash values. Other disclosed example apparatus include a hash manager to calculate the hash of the candidate password. Some example disclosed apparatus include a password vault to store the list of password hash values associated with previously used passwords, and a vault hash manager to calculate the hash values associated with previously used passwords. In still other examples, the apparatus includes a hash manager to calculate the hash of the candidate password, the hash manager and the vault hash manager comprising the same hash algorithm. Some example apparatus disclosed herein include a transmission delay manager to maintain the provisional transmission block until a blocking release authorization code is received, and other example apparatus disclosed herein include a client risk monitor to monitor a security feed to detect password hacking activity, in which the client risk monitor is to monitor at least one of a rich site summary feed, a Twitter feed, or a website for the password hacking activity, and wherein the alarm action engine is to generate a warning message when the password activity is detected and is associated with a service, the candidate password associated with the service. Other example apparatus disclosed herein include an application interface to generate an alternate password in response to the password hacking activity, which may also include a random number generator to generate the alternate password. Still further examples disclosed herein include the alarm action engine to compare a quantity of prior match conditions to a threshold value, each of the quantity of match conditions associated with an entity category type.

An example disclosed method includes invoking a provisional transmission block in response to detecting entry of a candidate password, retrieving a list of password hash values associated with previously used passwords, comparing the list of password hash values to a hash of the candidate password, and invoking a permanent block of the candidate password when a match condition occurs between the hash of the candidate password and a hash of one of the list of password hash values. Some example disclosed methods include calculating the hash of the candidate password, and storing the list of password hash values associated with previously used passwords. In still other disclosed examples, methods include calculating the hash of the candidate password with a same hash algorithm, and maintaining the provisional transmission block until a blocking release authorization code is received. Some example disclosed methods include monitoring a security feed to detect password hacking activity, and monitoring at least one of a rich site summary feed, a Twitter feed, or a website for the password hacking activity. Other example disclosed methods include generating a warning message when the password activity is detected and is associated with a service, the candidate password associated with the service. Still other example disclosed methods include generating an alternate password in response to the password hacking activity, and generating the alternate password with a random number generator. Some disclosed example methods include comparing a quantity of prior match conditions to a threshold value, wherein each of the quantity of match conditions is associated with an entity category type.

An example disclosed computer readable storage medium includes invoking a provisional transmission block in response to detecting entry of a candidate password, retrieving a list of password hash values associated with previously used passwords, comparing the list of password hash values to a hash of the candidate password, and invoking a permanent block of the candidate password when a match condition occurs between the hash of the candidate password and a hash of one of the list of password hash values. Some example disclosed instructions include calculating the hash of the candidate password, and storing the list of password hash values associated with previously used passwords. Other example disclosed instructions include calculating the hash of the candidate password with a same hash algorithm, and maintaining the provisional transmission block until a blocking release authorization code is received. Still other example disclosed instructions include monitoring a security feed to detect password hacking activity wherein the instructions cause the machine to monitor at least one of a rich site summary feed, a Twitter feed, or a website for the password hacking activity. In other examples, disclosed instructions include generating a warning message when the password activity is detected and is associated with a service, the candidate password associated with the service, and generating an alternate password in response to the password hacking activity. Some example disclosed instructions include generating the alternate password with a random number generator, and in other examples, the disclosed instructions include comparing a quantity of prior match conditions to a threshold value, wherein each of the quantity of match conditions is associated with an entity category type.

Another example disclosed apparatus includes a client risk monitor to identify an indication of hacking activity associated with a service, a password linkage monitor to identify whether a user has a password associated with the service having the indication of hacking activity, and an alarm action engine to prompt the user to update the password when the password linkage monitor identifies the password is associated with the service. Other disclosed example apparatus include the alarm action engine to invoke a block of the password to prevent further use with the service, in which a transmission delay manager is to release the block in response to receiving a blocking release authorization code. In some disclosed examples, the blocking release authorization code is invoked in response to the password being updated.

Another example disclosed method includes identifying an indication of hacking activity associated with a service, identifying whether a user has a password associated with the service having the indication of hacking activity, and prompting the user to update the password when the password linkage monitor identifies the password is associated with the service. In some examples, the method includes invoking a block of the password to prevent further use with the service, and releasing the block in response to receiving a blocking release authorization code. In still other examples, the method includes invoking the blocking release authorization code in response to the password being updated.

From the foregoing, it will be appreciated that the above disclosed methods, apparatus and articles of manufacture protect users of computing devices from generating multiple points of attack and/or failure with regard to password re-use. Abundant password re-use affords the user a great deal of convenience, but at the painful expense of security breach potential among many different services.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage password security, comprising:
a hardware processor to implement:
an alarm action engine to invoke a provisional transmission block of a candidate password associated with a user in response to detecting entry of the candidate password;
a transmission delay manager to maintain the provisional transmission block until a blocking release authorization code is received; and
a password linkage monitor to retrieve a list of password hash values, stored in a memory, the password hash values associated with previously used passwords associated with the user, the password linkage monitor to compare the list of password hash values to a hash value of the candidate password, the password linkage monitor to determine a count of the number of times the hash value of the candidate password matches a password hash value in the list, wherein the count represents a number of different online service sites where the candidate password has been used;
the alarm action engine to identify a service category type associated with the candidate password, the alarm action engine to identify a threshold based on the service category type, where the threshold for the service category type is dependent on a security risk for the service category type, the alarm action engine to compare the count with the threshold;
the alarm action engine to invoke a permanent block of the candidate password when the count meets or exceeds the threshold;
the alarm action engine to allow use of the candidate password when the count does not meet or exceed the threshold.

2. The apparatus as defined in claim 1, further including a hash manager to calculate the hash value of the candidate password.

3. The apparatus as defined in claim 1, further including a password vault to store the list of password hash values associated with previously used passwords.

4. The apparatus as defined in claim 3, further including a vault hash manager to calculate the hash values associated with previously used passwords.

5. The apparatus as defined in claim 1, further including a client risk monitor to monitor a security feed to detect password hacking activity.

6. The apparatus as defined in claim 5, wherein the client risk monitor is to monitor at least one of a rich site summary feed, a social media feed, or a website for the password hacking activity.

7. The apparatus as defined in claim 5, wherein the alarm action engine is to generate a warning message when the password hacking activity is detected and is associated with a service, the candidate password associated with the service.

8. The apparatus as defined in claim 7, wherein the warning message identifies the password associated with the service is used with a second service.

9. The apparatus as defined in claim 5, further including an application interface to generate an alternate password in response to the password hacking activity.

10. A method to manage password security, comprising:
invoking, with a hardware processor, a provisional transmission block of a candidate password associated with a user in response to detecting entry of the candidate password;
maintaining the provisional transmission block until a blocking release authorization code is received;
retrieving a list of password hash values associated with previously used passwords associated with the user;
comparing the list of password hash values to a hash value of the candidate password to determine a count of the number of times the hash value of the candidate password matches a password hash value in the list, wherein the count represents a number of different online service sites where the candidate password has been used;

identifying a service category type associated with the candidate password, identifying a threshold based on the service category type, where the threshold for the service category type is dependent on a security risk for the service category type, comparing the count with the threshold;

invoking a permanent block of the candidate password when the count meets or exceeds the threshold; and allowing use of the candidate password when the count does not meet or exceed the threshold.

11. The method as defined in claim 10, further including monitoring a security feed to detect password hacking activity.

12. The method as defined in claim 11, further including monitoring at least one of a rich site summary feed, a social media feed, or a website for the password hacking activity.

13. The method as defined in claim 11, further including generating a warning message when the password activity is detected and is associated with a service, the candidate password associated with the service.

14. The method as defined in claim 11, further including generating an alternate password in response to the password hacking activity.

15. A tangible computer readable storage medium comprising instructions stored thereon that, when executed, cause a hardware processor to, at least:

invoke a provisional transmission block of a candidate password associated with a user in response to detecting entry of the candidate password;

maintain the provisional transmission block until a blocking release authorization code is received;

retrieve a list of password hash values associated with previously used passwords associated with the user;

compare the list of password hash values to a hash value of the candidate password to determine a count of the number of times the hash value of the candidate password matches a password hash value in the list, wherein the count represents a number of different online service sites where the candidate password has been used;

identify a service category type associated with the candidate password, identify a threshold based on the service category type, where the threshold for the service category type is dependent on a security risk for the service category type, compare the count with the threshold;

invoke a permanent block of the candidate password when the count meets or exceeds the threshold;

allow use of the candidate password when the count does not meet or exceed the threshold.

16. The storage medium as defined in claim 15, wherein the instructions cause the machine to calculate the hash value of the candidate password.

17. The storage medium as defined in claim 16, wherein the instructions cause the machine to store the list of password hash values associated with previously used passwords.

18. The storage medium as defined in claim 17, wherein the instructions cause the machine to calculate the hash value of the candidate password with a same hash algorithm used to calculate the password hash values associated with the previously used passwords.

19. The storage medium as defined in claim 15, wherein the instructions cause the machine to monitor a security feed to detect password hacking activity.

20. The storage medium as defined in claim 19, wherein the instructions cause the machine to generate an alternate password in response to the password hacking activity.

* * * * *